US012771581B2

(12) United States Patent
Barbu et al.

(10) Patent No.: US 12,771,581 B2
(45) Date of Patent: Oct. 20, 2026

(54) DEVICES, METHODS AND APPARATUSES FOR TRANSFORMING SAMPLED SIGNAL

(71) Applicant: Nokia Technologies Oy, Espoo (FI)

(72) Inventors: Oana-Elena Barbu, Aalborg (DK); Diomidis Michalopoulos, Munich (DE); Muhammad Ikram Ashraf, Espoo (FI)

(73) Assignee: Nokia Technologies Oy, Espoo (FI)

( * ) Notice: Subject to any disclaimer, the term of this patent is extended or adjusted under 35 U.S.C. 154(b) by 93 days.

(21) Appl. No.: 18/403,375

(22) Filed: Jan. 3, 2024

(65) Prior Publication Data

US 2024/0283681 A1 Aug. 22, 2024

(30) Foreign Application Priority Data

Feb. 17, 2023 (GB) ..................................... 2302277

(51) Int. Cl.
*H04L 25/06* (2006.01)
*H04L 5/00* (2006.01)
*H04W 72/54* (2023.01)

(52) U.S. Cl.
CPC .......... *H04L 25/068* (2013.01); *H04L 5/0048* (2013.01); *H04W 72/54* (2023.01)

(58) Field of Classification Search
CPC ............... H04L 27/3872; H04L 5/0092; H04L 27/2628; H04L 2027/0018; H04L 2027/0085; H04L 27/0014; H04L 27/2621; H04L 27/2634; H04L 27/26362; H04L 27/368; H04L 27/26; H04L 7/26
See application file for complete search history.

(56) References Cited

U.S. PATENT DOCUMENTS

2015/0236808 A1* 8/2015 Liu ....................... H04L 1/0019 370/252
2016/0192424 A1* 6/2016 Suzuki .................... H04W 8/24 370/328
2018/0343635 A1 11/2018 Edge et al.
(Continued)

FOREIGN PATENT DOCUMENTS

WO 2022/031673 A1 2/2022
WO 2022/155244 A2 7/2022
(Continued)

OTHER PUBLICATIONS

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.
(Continued)

*Primary Examiner* — David S Huang
(74) *Attorney, Agent, or Firm* — Barta Jones, PLLC

(57) ABSTRACT

Embodiments of the present disclosure disclose devices, methods and apparatuses for transforming sampled signal. The terminal device receives, from a network device, a request that the terminal device applies a transformation operation to a sampled signal; obtains a transformed signal by applying the transformation operation to the sampled signal; and transmits the transformed signal to the network device. By the proposed processing for the sampled signal, the terminal device-specific RF and/or baseband (BB) architecture becomes transparent to the network device.

14 Claims, 7 Drawing Sheets

(56) References Cited

U.S. PATENT DOCUMENTS

| | | | |
|---|---|---|---|
| 2021/0352610 A1 | 11/2021 | Gummadi et al. | |
| 2022/0046577 A1 | 2/2022 | Sundararajan et al. | |
| 2022/0338203 A1 | 10/2022 | Cha et al. | |
| 2022/0368488 A1 | 11/2022 | Berggren et al. | |
| 2022/0408220 A1 | 12/2022 | Edge et al. | |
| 2023/0003831 A1 | 1/2023 | Barbu et al. | |
| 2024/0171428 A1* | 5/2024 | Hu | H04L 1/0026 |

FOREIGN PATENT DOCUMENTS

| | | |
|---|---|---|
| WO | 2022/226445 A1 | 10/2022 |
| WO | 2022/269467 A2 | 12/2022 |
| WO | 2022/271275 A1 | 12/2022 |

OTHER PUBLICATIONS

"Discussion on general aspects of AI/ML framework", 3GPP TSG-RAN WG1 Meeting #111, R1-2210884, Agenda: 9.2.1, Huawei, Nov. 14-18, 2022, 21 pages.

"New WID: NR Positioning Support", 3GPP TSG RAN Meeting #83, RP-190752, Agenda: 9.1.1, Intel Corporation, Mar. 18-21, 2019, 6 pages.

"Revised WID on NR Positioning Enhancements", 3GPP TSG RAN Meeting #91e, RP-210897, Agenda: 9.7.25, Intel Corporation, Mar. 16-26, 2022, 6 pages.

"Evaluation on AI/ML for positioning accuracy enhancement", 3GPP TSG- RAN WG1 Meeting #109-e, R1-2204242, Agenda: 9.2.4.1, Apple Inc., May 9-20, 2022, 7 pages.

"AI and ML for positioning enhancement", 3GPP TSG-RAN WG1 Meeting #110, R1-2206524, Agenda: 9.2.4.2, NVIDIA, Aug. 22-26, 2022, 7 pages.

"Evaluation on AI/ML for positioning accuracy enhancement", 3GPP TSG RAN WG1 Meeting #110, R1-2205915, Agenda: 9.2.4.1, Purple Mountain Laboratories, Aug. 22-26, 2022, 6 pages.

"AI/ML Positioning use cases and associated impacts", 3GPP TSG RAN WG1#110, R1-2206515, Agenda: 9.2.4.2, Lenovo, Aug. 22-26, 2022, pp. 1-9.

"Msc-generator", Sourceforge, Retrieved on Jan. 30, 2024, Webpage available at :https://sourceforge.net/projects/msc-generator/.

"3rd Generation Partnership Project; Technical Specification Group Radio Access Network; LTE Positioning Protocol (LPP) (Release 17)", 3GPP TS 37.355, V17.2.0, Sep. 2022, pp. 1-347.

"3rd Generation Partnership Project; Technical Specification Group Radio Access Network; NG-RAN; NR Positioning Protocol A (NRPPa) (Release 17)", 3GPP TS 38.455, V17.2.0, Sep. 2022, pp. 1-201.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.2.0, Sep. 2022, pp. 1-133.

"3rd Generation Partnership Project; Technical Specification Group Radio Access Network; NR; Physical channels and modulation (Release 17)", 3GPP TS 38.211, V17.3.0, Sep. 2022, pp. 1-136.

"3rd Generation Partnership Project; Technical Specification Group Radio Access Network; NR; Physical layer procedures for data (Release 17)", 3GPP TS 38.214, V17.3.0, Sep. 2022, pp. 1-233.

Zemen et al., "Time-variant channel estimation using discrete prolate spheroidal sequences", IEEE Transactions on Signal Processing, vol. 53, No. 9, Sep. 2005, pp. 3597-3607.

"Other aspects on AI/ML for positioning accuracy enhancement", 3GPP TSG RAN WG1 #112, R1-221xxxx, Agenda: 9.2.4.2, Nokia, Feb. 27-Mar. 3, 2023, 27 pages.

"Discussion on AI/ML for positioning accuracy enhancement", 3GPP TSG RAN WG1 #110, R1-2206477, Agenda: 9.2.4.2, NEC, Aug. 22-26, 2022, pp. 1-6.

"Other aspects on AI-ML for positioning accuracy enhancement", 3GPP TSG RAN WG1 #111, R1- 2212113, Agenda: 9.2.4.2, Qualcomm Incorporated, Nov. 14-18, 2022, pp. 1-24.

"IEEE 802.11", Wikipedia, Retrieved on Jan. 30, 2024, Webpage available at : https://en.wikipedia.org/wiki/IEEE_802.11.

Search Report received for corresponding United Kingdom Patent Application No. 2302277.5, dated Aug. 16, 2023, 6 pages.

"3rd Generation Partnership Project; Technical Specification Group Radio Access Network; Study on Artificial Intelligence (AI)/Machine Learning (ML) for NR air interface (Release 18)", 3GPP TR 38.843, V1.2.0, Nov. 2023, pp. 1-164.

Extended European Search Report received for corresponding European Patent Application No. 24150283.0, dated Jun. 25, 2024, 9 pages.

"Other aspects on ML for positioning accuracy enhancement", 3GPP TSG RAN WG1 #112bis-e, R1-2302633, Agenda: 9.2.4.2, Nokia, Apr. 17-26, 2023, 35 pages.

* cited by examiner

DEVICES, METHODS AND APPARATUSES FOR TRANSFORMING SAMPLED SIGNAL

FIELD

Embodiments of the present disclosure generally relate to the field of communication, and in particular, to devices, methods, apparatuses and a computer readable storage medium for transforming a sampled signal.

BACKGROUND

In NR positioning, the target UE is requested to either measure or send positioning reference signals (DL-PRS, UL-SRS) which are used by the new radio network NR NW (e.g. LMF) to compute the UE location. The NR LPP protocol requires a positioning receiver (e.g. UE in DL positioning, Transmit/Receive Point (TRP) in UL positioning) to extract a set of positioning measurements representative of the propagation environment, which are subsequently used to calculate the UE location. Such positioning measurements have physical meanings, i.e., they are meant to characterize the wireless propagation environment.

Thus, acquiring accurate positioning measurements becomes paramount to producing accurate location estimates. There are however several limitations of the accuracy of measurements. As of today, each positioning measurement absorbs errors caused by several limitations of the accuracy of measurements; therefore, location estimation accuracy is bounded by both the signal bandwidth and the accuracy and type of positioning receiver. Furthermore, the standard positioning protocol offers limited flexibility, with regard to adapting the type of measurements and their reporting frequency to the dynamics of the propagation conditions experienced by the UE. Therefore, it is desired to improve the positioning measurements.

SUMMARY

In general, example embodiments of the present disclosure provide devices, methods, apparatuses and a computer readable storage medium for transforming a sampled signal.

In a first aspect, there is provided a terminal device. The terminal device may comprise: at least one processor and at least one memory storing instructions that, when executed by the at least one processor, cause the apparatus at least to: receive, from a network device, a request that the terminal device applies a transformation operation to a sampled signal; obtain a transformed signal by applying the transformation operation to the sampled signal; and transmit the transformed signal to the network device.

In a second aspect, there is provided a network device. The network device may comprise: at least one processor and at least one memory storing instructions that, when executed by the at least one processor, cause the apparatus at least to: transmit, to a terminal device, a request that the terminal device applies a transformation operation to a sampled signal; receive, from the terminal device, a transformed signal obtained by applying the transformation operation to the sampled signal; and reconstruct the transformed signal to obtain a reconstructed signal of the sampled signal.

In a third aspect, there is provided a method. The method may comprise: receiving, at a terminal device from a network device, a request that the terminal device applies a transformation operation to a sampled signal; obtaining a transformed signal by applying the transformation operation to the sampled signal; and transmitting the transformed signal to the network device.

In a fourth aspect, there is provided a method. The method may comprise: transmitting, at a network device to a terminal device, a request that the terminal device applies a transformation operation to a sampled signal; receiving, from the terminal device, a transformed signal obtained by applying the transformation operation to the sampled signal; and reconstructing the transformed signal to obtain a reconstructed signal of the sampled signal.

In a fifth aspect, there is provided an apparatus. The apparatus may comprise: means for receiving, at a terminal device from a network device, a request that the terminal device applies a transformation operation to a sampled signal; means for obtaining a transformed signal by applying the transformation operation to the sampled signal; and means for transmitting the transformed signal to the network device.

In a sixth aspect, there is provided an apparatus. The apparatus may comprise: means for transmitting, at a network device to a terminal device, a request that the terminal device applies a transformation operation to a sampled signal; means for receiving, from the terminal device, a transformed signal obtained by applying the transformation operation to the sampled signal; and means for reconstructing the transformed signal to obtain a reconstructed signal of the sampled signal.

In a seventh aspect, there is provided a non-transitory computer readable medium comprising program instructions for causing an apparatus to perform at least the method according to third or fourth aspect.

In an eighth aspect, there is provided a computer program comprising instructions, which, when executed by an apparatus, cause the apparatus at least to: receive, from a network device, a request that the terminal device applies a transformation operation to a sampled signal; obtain a transformed signal by applying the transformation operation to the sampled signal; and transmit the transformed signal to the network device.

In a ninth aspect, there is provided a computer program comprising instructions, which, when executed by an apparatus, cause the apparatus at least to: transmit, to a terminal device, a request that the terminal device applies a transformation operation to a sampled signal; receive, from the terminal device, a transformed signal obtained by applying the transformation operation to the sampled signal; and reconstruct the transformed signal to obtain a reconstructed signal of the sampled signal.

In a tenth aspect, there is provided a terminal device. The terminal device may comprise: a receiving circuitry configured to receive, from a network device, a request that the terminal device applies a transformation operation to a sampled signal; an obtaining circuitry configured to obtain a transformed signal by applying the transformation operation to the sampled signal; and a transmitting circuitry configured to transmit the transformed signal to the network device.

In an eleventh aspect, there is provided a network device. The network device may comprise: a transmitting circuitry configured to transmit, to a terminal device, a request that the terminal device applies a transformation operation to a sampled signal; a receiving circuitry configured to receive, from the terminal device, a transformed signal obtained by applying the transformation operation to the sampled signal; and a reconstructing circuitry configured to reconstruct the transformed signal to obtain a reconstructed signal of the sampled signal.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
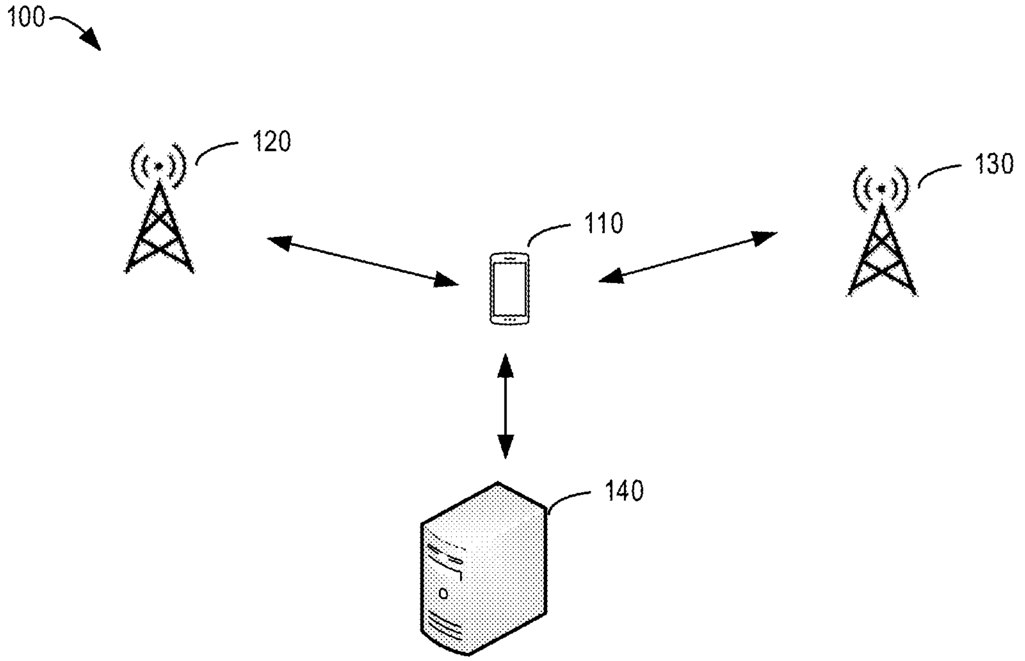
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, in NR positioning, the target UE is requested to either measure or send positioning reference signals (DL-PRS, UL-SRS) which are used by the NR NW (e.g. LMF) to compute the UE location. The NR LPP protocol requires a positioning receiver (e.g. UE in DL positioning, TRP in UL positioning) to extract a set of positioning measurements representative of the propagation environment, and the extracted positioning measurements are subsequently used to determine the UE location. Such positioning measurements have physical meanings i.e., they are meant to characterize the wireless propagation environment (e.g. number of reflectors and their relative locations with respect to the target) and they may be a combination of the following (a) to (e):

(a) line of sight (LOS) indicator/probability indicating of whether there is a direct path between TX and RX;

(b) time of arrival (TOA)/time-difference of arrival (TDOA), i.e. the delay of the direct path between the TX and RX;

(c) carrier phase, indicative of the rotation the signal phase undergoes as a result of traveling the distance between TX and RX;

(d) power of the first path, indicative of the path loss and hence direct distance; and (e) power and delays of multiple paths indicative of the number of reflectors between the TX and RX points, etc.

Thus, acquiring accurate positioning measurements becomes paramount to producing accurate location estimates. There are however several following limitations (i)-(iv) for the accuracy of measurements:

(i). first, their resolution is limited by the bandwidth of the signal from which they are extracted;

(ii). second, the accuracy depends on the positioning receiver capability e.g. if it can go beyond the sampling resolution limitation, how well it can cope with low SINR conditions, etc.;

(iii). third, the accuracy also depends on how clean the received signal is i.e. whether it is interfered or not, type of interference (white or colored); and, (iv). lastly, the accuracy is also subject to RF impairments of the receiver e.g.:

how well the RX tunes to the carrier frequency: an inaccurate frequency lock yields a carrier frequency offset which translates in a poor signal phase acquisition;

how fast the clock of the receiver runs compares to that of the transmitters, and an inaccurate clock yields a sampling time offset which translates in a wrong time/phase of arrival acquisition; and other phase noises, etc.

As of today, each positioning measurement absorbs all errors (i)-(iv) mentioned above, therefore location estimation accuracy is bounded by both the signal bandwidth and the accuracy and type of positioning receiver. Furthermore, the standard positioning protocol offers limited flexibility with regard to adapting the type of measurements and their reporting frequency to the dynamics of the propagation conditions experienced by the UE.

With the development of communication technology, the AI/ML-based method has been develop to facilitate CSI feedback enhancement (e.g., overhead reduction, improved accuracy, prediction), Beam management (e.g., beam prediction in time, and/or spatial domain for overhead and latency reduction, beam selection accuracy improvement), positioning accuracy enhancements, not limited to only the positioning accuracy and can include different aspects of positioning e.g., identification of NLOS, latency, overhead reduction, reduced complexity. In this way, the AI input and associated pre-processing (e.g. normalization) needed for the different positioning use cases and their possible specification impacts.

For AI/ML based positioning enhancements, study potential specification impact related to report/feedback of model input for inference, type of model input, and model input acquisition and pre-processing. However, the type of the model input and model input acquisition and pre-processing may have potential impact on the standard. Currently, there have been preliminary generic discussions about the pre-processing of the input data for the model; however, there is not any work to specify how the input data can be pre-processed for the given positioning AI/ML model and subsequently, how the input data can be able to meet the required positioning requirements.

In view of the above, some embodiments of the present disclosure proposed a solution for tackling the limitation on the potential of positioning performance that comes from the "physical" boundaries of positioning measurements (see items (i)-(iv) above), as well as the absence of adaptation to UE radio conditions. To avoid the some or all of the above deficiencies altogether, machine learning methods may be used and thus the method may move away from: using overly-processed positioning measurements (a)-(e) and using a fixed reporting periodicity and the reporting payload.

Specifically, in some embodiments of the present disclosure, a ML framework for enhanced localization, through which the measurement collection and reporting is agnostic, is proposed with respect to the ML model that uses the measurements. Specifically, the ML framework moves away from the standard NR positioning paradigm which requires a positioning receiver to extract positioning measurements that are physically explainable (see items (a)-(e) mentioned above). Instead, the proposed ML framework requires the positioning receiver to extract a set of signal features which may characterize the RX signal in a best way, and the NW can then use the extracted set of signal features to reconstruct said RX signal. Having reconstructed the RX signal, the NW may use it to compute the UE location and infer UE-specific intrinsic errors. By doing so, the UE-specific RF and/or baseband (BB) architecture (e.g. number of RF chains, sampling frequency) becomes transparent to the NW.

For illustrative purposes, principle and example embodiments of the present disclosure for the ML framework for enhanced localization will be described below with reference to FIGS. 1-7. However, it is to be noted that these embodiments are given to enable the skilled in the art to understand inventive concepts of the present disclosure and implement the solution as proposed herein, and not intended to limit scope of the present application in any way.

FIG. 1 illustrates an example network environment 100 in which example embodiments of the present disclosure may be implemented. The environment 100, which may be a part of a communication network, includes terminal devices and network devices.

As illustrated in FIG. 1, the communication network 100 may include a terminal device 110 (hereinafter may also be referred to as user equipment 110 or a UE 110). The communication network 100 may further include a network device 120, a network device 130 (hereinafter may also be referred to as a TRP or site) and a network device 140 (hereinafter may also be referred to as a Location management entity (LMF) or an access network device). In DL positioning, the network device or TRP 120 and 130 may transmit positioning reference signals (PRS) to the terminal device 110, and the network device 140 may request the UE 110 to collect PRS samples for each selected TRP 120 or 130.

It is to be understood that the number of network devices and terminal devices is given only for the purpose of illustration without suggesting any limitations. The system 100 may include any suitable number of network devices and/or terminal devices adapted for implementing embodiments of the present disclosure. Although not shown, it would be appreciated that one or more terminal devices may be located in the environment 100.

Communications in the network environment 100 may be implemented according to any proper communication protocol(s), comprising, but not limited to, the third generation (3G), the fourth generation (4G), the fifth generation (5G) or beyond, wireless local network communication protocols such as institute for electrical and electronics engineers (IEEE) 802.11 and the like, and/or any other protocols currently known or to be developed in the future. Moreover, the communication may utilize any proper wireless communication technology, comprising but not limited to: multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connection (DC), and new radio unlicensed (NR-U) technologies.

Figure 2:
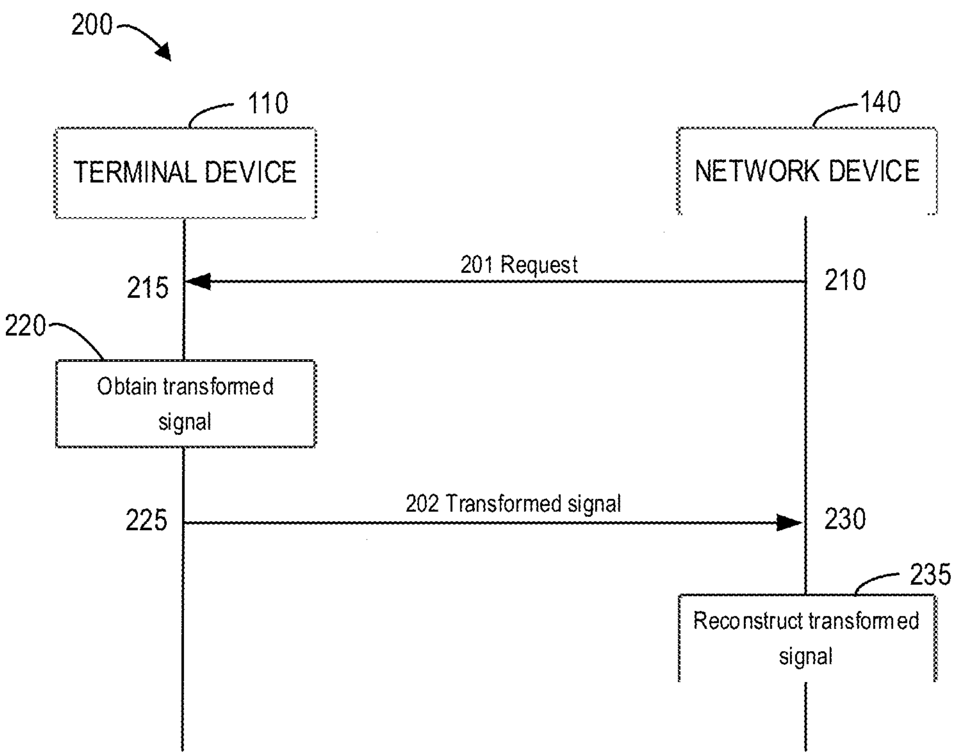
FIG. 2 illustrates an example signaling process for transforming the sampled signal according to some embodiments of the present disclosure.

FIG. 2 illustrates an example signaling process 200 for transforming the sampled signal according to some embodiments of the present disclosure. For the purpose of discussion, the process 200 will be described with reference to FIG. 1. The process 200 may involve the terminal device 110 and network device 140 as illustrated in FIG. 1. It would be appreciated that although the process 200 has been described in the communication environment 100 of FIG. 1, this process may be likewise applied to other communication scenarios with similar issues.

In the process 200, the network device 140 transmits (210) to the terminal device 110, a request 201 that the terminal device 110 applies a transformation operation to a sampled signal.

In one embodiment, the sampled signal is obtained by the terminal device 110 through sampling one or more signals received from one or more transmitters, for example, the network devices 120 and/or 130 as shown in FIG. 1. The signal received from the transmitter, for example, the network device 120 or 130, comprises a reference signal (RS), for example a positioning reference signal (PRS) or a sounding reference signal (SRS). However, the signal may be any type of signals that can be used for positioning purpose.

In the process 200, the terminal device 110 receives (215) the request. As shown in FIG. 2, upon reception (215) of the request, the terminal device 110 obtains (220) a transformed signal 202 by applying the transformation operation to the sampled signal.

In one embodiment, the transformation operation comprises a projection operation. For example, the terminal device 110 is required to collect positioning reference signal (PRS) samples for each selected transmitter or TRP, and to apply a new projection operation to each of the signal sample vectors, and then return the result of the projection operation.

In one embodiment, the transformation operation is performed at the terminal device 110 by applying a projector or a basis to the sampled signal. In an example, the projector or the basis comprises at least one of the following: a matrix, a multivariate function, or an operation for extracting a set of metrics. For example, the combination between the sampled signal and the projector or basis may be performed by projecting the sampled signal onto the projector or basis.

In one embodiment, a projector or basis is transmitted from the network device 140 to the terminal device 110. For example, one corresponding transformation operation is applied by the terminal device 110 to the sampled signal.

In another embodiment, a set of projectors are configured by the network device 140 and transmitted to the terminal device 110, and the terminal device 110 will select a proper projector for the sampled signal on its own. For example, a set of transformation operations, corresponding to the set of projectors, are applied by the terminal device 110 to a plurality of sampled signals.

Prior applying a suitable transformation operation to the sampled signal, the terminal device 110 may select the suitable transformation operation for the sampled signal.

In one embodiment, the terminal device 110 may select the suitable projector based on the signal quality of the sample signal.

For example, under a condition that the sampled signal is associated with a target signal quality (for example, minimal signal to noise ratio (SNR) level), the terminal device 110 will apply the transformation operation to the sampled signal so as to determine the transformed signal 202. For example, if the sampled signal has the signal quality higher than the minimal SNR level, the terminal device 110 may determine to apply the transformation operation to the sampled signal. That is to say, if the sampled signal has the signal quality lower than the minimal SNR level, the terminal device 110 will reject the transformation operation.

For example, the network device 140 may configure a set of projectors along with a set of conditions and transmit information including at least one of the set of projectors and the set of conditions to the terminal device 110. The set of conditions correspond to the set of transformation operations performed based on the set of projectors. Each condition may be associated with signal quality level of the sampled signal. For example, if the signal quality level of the sampled signal exceeds a first threshold for a first amount of time, a first projector will be selected by the terminal device 110. For example, if the signal quality level of the sampled signal exceeds a second threshold for the first amount of time, a second corresponding projector will be selected by the terminal device 110. The first threshold may be less than the second threshold. For example, if the signal quality level of the sampled signal exceeds a second threshold for the second amount of time longer than the first amount of time, a third projector will be selected by the terminal device 110.

In one embodiment, the terminal device 110 may select the suitable projector based on an indication indicative of at least one of the following: a terminal device capability, a terminal device radio frequency (RF) imperfections, or a terminal device panel spatial setup.

In one embodiment, the terminal device 110 may select the projector indicated by the network device 140 for the sampled signal(s). For example, a fixed mapping between the projector M and a sampled signal is configured by the network device 140, and when selecting the projector, the mapping should be respected. In this case, the network device 140 explicitly indicates to the UE that projector or basis M(j) should be used for sampled signal, for example, PRS(k), . . . , PRS(l), etc.

In one embodiment, based on determining that the terminal device 110 is incapable of performing the transformation operation, the terminal device 110 may reject the transformation operation. For example, if a projector M(k) implements a too complex operation in terms of number of CFLOPS, the terminal device 110 may reject to do so, for example, due to the limited capability of the terminal device 110. The capability may be computational capability, battery power, or a feature set support and the like. For example, if the sampled signal has a poor signal quality less than the minimal SNR level, the terminal device 110 may also reject the transformation operation.

Based on determining that the terminal device 110 is capable of performing the transformation operation, the transformed projector and the transformed signal both may be obtained.

In one embodiment, the selected transformation operation or projector is transmitted along with the transformed signal by the terminal device 110 to the network device 140.

In one embodiment, if a difference between the transformed signal and a previous transformed signal stored at the terminal device is greater than a transformed signal threshold, the terminal device 110 may transmit the transformed signal to the network device 140, and if the difference is less than the transformed signal threshold, the terminal device 110 may indicate via a flag, to the network device 140, the previous transformed signal is to be reused. In one embodiment, the difference may be mean squared error (MSE), the l1 norm, etc. For example, the network device 140 may request the terminal device 110 to reply with the result projected-PRS only if the current result is significantly different than the past report, and otherwise indicate that it is similar to a past report via a flag. For example, the network device 140 may indicate a minimal Mean Squared Error (MSE) value (between the current report and past report) which triggers a full reporting.

As shown in FIG. 2, the terminal device 110 transmits (225) the transformed signal 202 to the network device 140. Accordingly, the network device 140 receives (230) the transformed signal 202. Upon reception (230) of the transformed signal 202, the network device 140 reconstructs (235) the transformed signal to obtain a reconstructed signal of the sampled signal.

In one embodiment, the reconstructed signal is used by the network device 140 to determine a position of the terminal device 110 and an intrinsic positioning error in the terminal device 110. For example, the network device 140 uses the transformed signal, for example, "projected-PRS" and reconstructs "RX-PRS" using the selected basis M(j). The network device 140 now has obtained the received signal as observed by the terminal device 110.

The network device 140 applies an (ML-based) positioning model of choice to estimate the UE location and optionally or additionally, a cumulative intrinsic positioning error representative of the cumulative errors i-iv as defined above. The error may be used to compensate future positioning measurements which are collected via the standard LPP.

By the process 200 as shown in FIG. 2, the ML framework moves away from the standard NR positioning paradigm which requires a positioning receiver to extract positioning measurements that are physically explainable (see items (a)-(e) mentioned above). Instead, the proposed ML framework requires the positioning receiver to extract a set of signal features which may characterize the RX signal in a best way, and the NW can then use the extracted set of signal features to reconstruct said RX signal. Having reconstructed the RX signal, the NW may use it to compute the UE location and infer UE-specific intrinsic errors. Therefore, the ML-based method renders positioning approach more robust, since it minimizes the measurement and Rx error when measuring PRS. Further, the ML-based method minimizes the impact of Hardware limitations at the UE side to the positioning process, since it decouples the positioning performance from UE RF performance. In addition, the ML-based method is in line with positioning, which diverts from traditional measurement-based approaches and focuses on ML-assisted positioning.

Figure 3A:
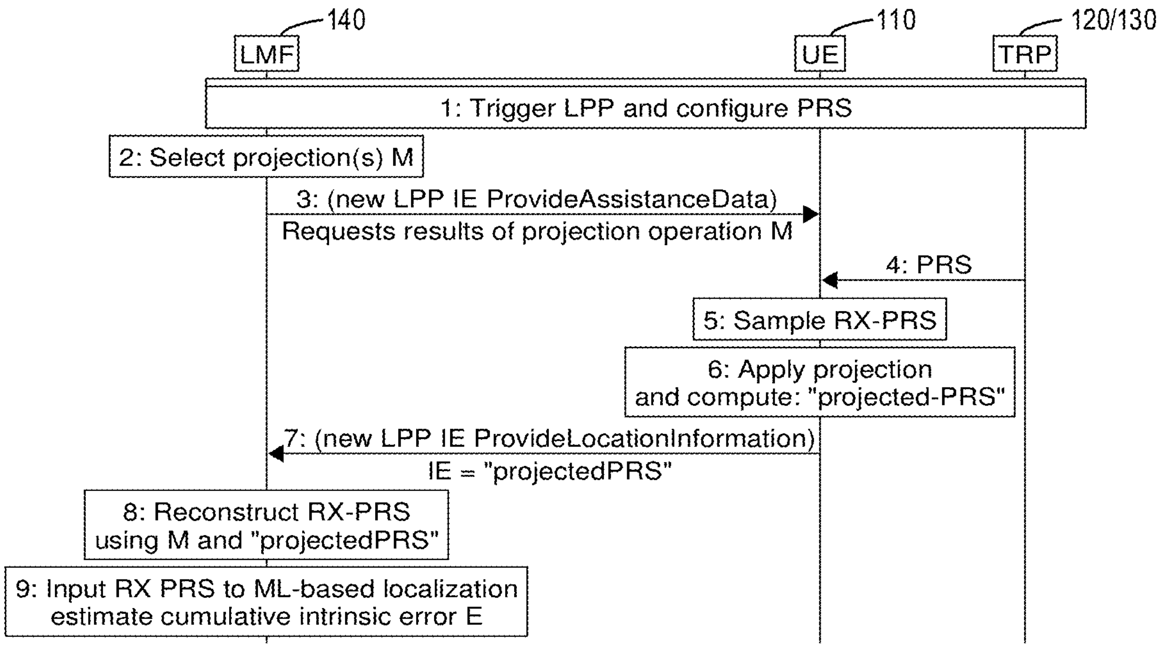
FIG. 3A illustrates an example signaling process for link-transparent processing of sampled signal according to some embodiments of the present disclosure.

FIG. 3A illustrates an example signaling process for link-transparent processing of sampled signal according to some embodiments of the present disclosure. The process on positioning signaling exchange results in modifications to the existing LPP protocol; the new proposed approach and protocol are referred as ML-based LPP (ML-based LPP). It should be understood by the person skilled in the art that although the proposed ML-based LPP as shown in FIG. 3A is described in the context of DL positioning. However, the UL positioning case is considered a straightforward extension of the DL, and falls within the protection scope of the present disclosure.

As shown in FIG. 3A, at step 1, the LMF 140 configures an LPP session and selects a set of TRPs, such as TRP 120 and TRP 130 and assigning them unique PRS. At step 2, the LMF 140 selects one projection operation or projector M or a list of allowed projection operations or projectors M(1), M(2), etc. The projection operation is one example of the transformation operation.

The LMF 140 selects a list of allowed projections M1, M2, etc. For the purpose of example only, the LMF 140 may choose M as a Slepian basis with a given Doppler shift, or as a Fourier transform basis with a pre-selected resolution, etc.

Specifically, the LMF 140 provides the UE 110 a set of rules (e.g. projection M) that should be followed to transform the RX signal y into a smaller signal r. It is ultimately the smaller signal r that is being sent to the LMF 140 by the UE 110. Then, the LMF 140 reconstructs y by applying the inverse operation to the reported signal r. The projection may be a matrix M e.g. DFT matrix, a Slepian transformation, for which the LMF 140 configures the resolution, size (in case of the DFT matrix), the number of components (in case of the Slepian transformation).

In one embodiment, other projections may be also used, e.g. r can be obtained by other linear combinations of signal y with known matrices sent by the LMF e.g. r=Wy+b, where W and b are sent by the network and characterize the cross-covariance between r and y and respectively the noise variance.

As shown in FIG. 3A, at step 3, the LMF 140 sends a request for results of projection operation or projector M to the UE 110. For example, the LMF 140 transfers the list to the UE 110 in a new IE carried by the LPP assistance data. Specifically, that is new IE within the LPP ProvideAssistanceData message as specified in TS 37.355. Specifically, the LMF 140 requests the UE 110 to collect PRS samples for each selected TRP 120 or 130, and to apply a new projection operation to each of the signal samples vector. That is to say, the PRSs received from the selected TRP are sampled and collated by the UE 110 as a vector; and then the new projection operation or projector M is applied to the sampled vector.

In first embodiment, the LMF 140 transfers to the UE 110 a projector/basis M (where M may be a matrix, a multivariate function, a set of operations for extracting a set of metrics etc.) and requires the UE 110 to return the results of projecting each RX signal y onto the selected basis, i.e. perform r=My and return r, where r is called projected-PRS in FIG. 3A. Performing r=My may reduce the dimensionality of the report (e.g. similar to a feature extraction operation like eigenvalue decomposition, principal component analysis, etc.).

In second embodiment, the LMF 140 provides to the UE 110 the conditions under which the UE 110 should project the measurements (i.e. the sampled RX-PRS) onto the selected basis M. As an example, the LMF/NW 140 configures the UE 110 to report projected-PRS if the collected signal samples are associated with a minimal signal quality e.g. a target SNR level. That is to say, the collected signal samples should have the minimal signal quality.

In third embodiment, the LMF/NW 140 provides to the UE 110 a list/set of projection operations or projectors e.g. M(1), M(2), . . . and configures the UE 110 to decide on the projection operation or projector itself. For example, in one embodiment, the projection is determined by the UE 110 based on UE capabilities and/or UE RF imperfections. In one embodiment, the projection is determined by the UE 110 based on UE panel spatial setup.

In another embodiment, the UE 110 may report to the LMF 140 any limitations related to implementing the above-mentioned first to third embodiments. For example, prior to receiving the request at step 3 or in response to receiving the request at step 3, the UE 110 may indicate to the LMF 140 that it can support only a subset of operations for implementing the above-mentioned first, second and third embodiments, and can operate for a limited period of time.

In another embodiment, the LMF 140 may request the UE 110 to reply with the result projected-PRS only if the current result is significantly different than the past report, and otherwise indicate that it is similar to a past report via a flag. For example, the LMF 140 may indicate a minimal Mean Squared Error (MSE) value (between the current report and past report) which triggers a full reporting.

As shown in FIG. 3A, at step 4, the UE 110 receives PRS from each TRP 120 or 130. At step 5, the UE 110 samples the PRS and collects the signal samples as a vector RX-PRS. At step 6, the UE 110 applies the projection operation as indicated at step 3 and obtains the vector projected-PRS. At step 7, the UE 110 reports the resulting projection “projected-PRS” to the LMF 140.

In one embodiment, in the case that the projection operation is decided at the UE side, at step 7, the UE 110 indicates the projection operation or projector M(j) to the LMF 140 together with the resulting projection “projected-PRS”.

In one embodiment, in the case that the projection operation produces a projected-PRS that is close (e.g. a small MSE between the current projected-PRS and a past reported projection resulting, i.e. a previous projected-PRS) to a past reported projection, then the UE 110 may indicate to the LMF 140 that the past reported value still may be used e.g. via a binary flag.

As shown in FIG. 3A, at step 8, the LMF 140 uses the “projected-PRS” and reconstructs “RX-PRS” using the basis M(j) to obtain reconstructed PRS. The LMF 140 now has obtained the received signal, i.e. PRS, as observed by the UE 110.

As shown in FIG. 3A, at step 9, the LMF 140 applies a ML-based positioning model of choice to the reconstructed PRS so as to estimate the UE location. Optionally or additionally, a cumulative intrinsic positioning error representative of the cumulative errors (i)-(iv) as defined above also may be estimated accordingly. The error may be used to compensate future positioning measurements which are collected via the standard LPP.

Figure 3B:
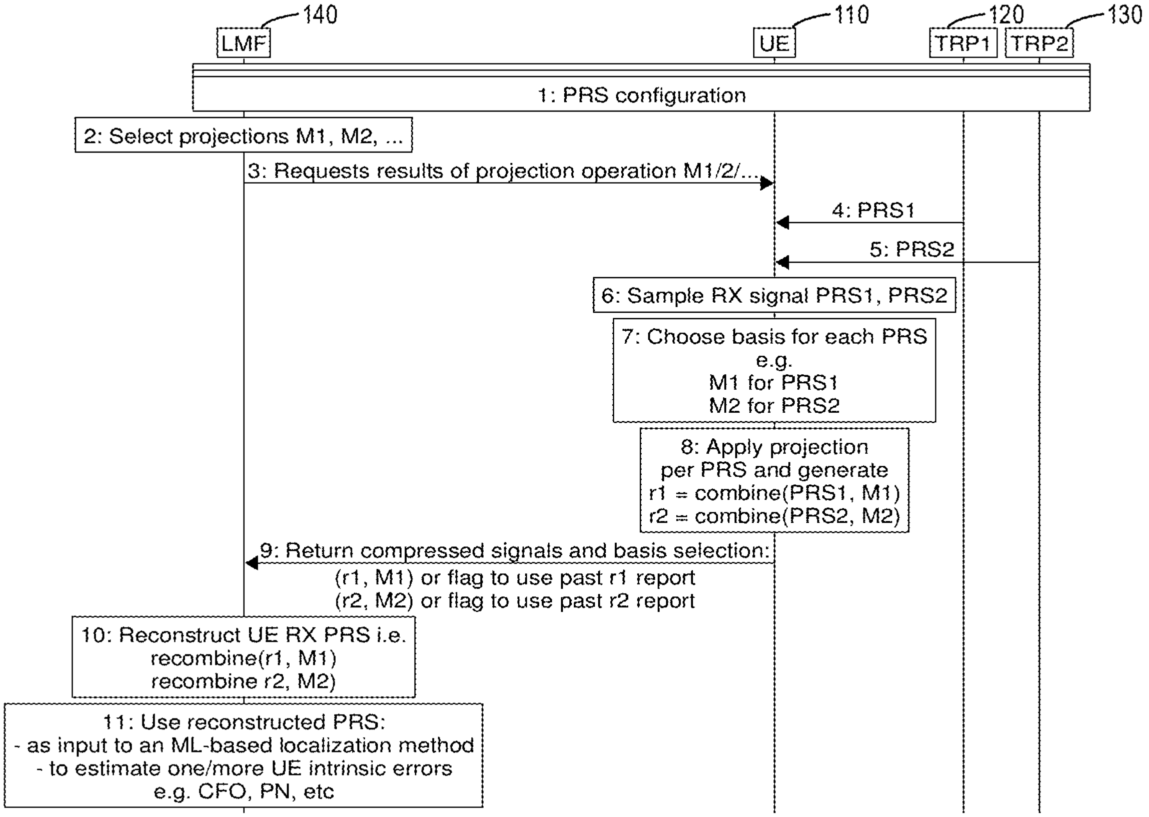
FIG. 3B illustrates another example signaling process for link-transparent processing of sampled signal according to some embodiments of the present disclosure.

FIG. 3B illustrates another example signaling process for link-transparent processing of sampled signal according to some embodiments of the present disclosure. It should be understood by the person skilled in the art that although the proposed ML-based LPP as shown in FIG. 3B is described in the context of DL positioning. However, the UL positioning case is considered a straightforward extension of the DL, and falls within the protection scope of the present disclosure.

In the following, for the steps shown in FIG. 3B, the steps same as that of FIG. 3A will not be described again, only the difference from FIG. 3A will be described.

As shown in FIG. 3B, at step 2, a set of allowed projections M1, M2 and the like are selected by the LMF 140. For the purpose of example only, the LMF 140 may choose M as a Slepian basis with a given Doppler shift, or as a Fourier transform basis with a pre-selected resolution, etc.

Then, as shown in FIG. 3B, at step 3, the LMF 140 transfers the list to the UE 110 in a new IE carried by the LPP assistance data. Specifically, that is new IE within the LPP Provide Assistance Data message as specified in TS 37.355.

The LMF 140 also specifies to the UE 110 how to combine the received PRS with the projection/basis M (e.g. function "combine" in step 8 in FIG. 3B) via a message "Request results of projection operation M1/2/" as shown in step 3 of FIG. 3B. Furthermore, the LMF 140 indicates to the UE 110 via this message at step 3: (A) whether the UE is allowed to freely choose the basis for each TRP, or (B) whether a fixed mapping between basis and PRS should be respected.

In the case (A), the UE 110 selects the basis for each TRP based on an indication indicative of at least one of the following: a terminal device capability, a terminal device radio frequency (RF) imperfections, or a terminal device panel spatial setup.

In the case (B), the LMF 140 explicitly indicates to the UE 110 that basis M(j) should be used for PRS(k), . . . , PRS(1), etc. This new functionality and signaling to the UE is illustrated in FIG. 3B with the message "Request results of projection operation M1/2/ . . . ".

As shown in FIG. 3B, upon reception of the projection list, the UE 110 proceeds at step 6 to sample the signals received from TRP1 120 and TRP 130 at steps 4 and 5.

As shown in FIG. 3B, at step 7, the UE 110 may select a basis per PRS resource according to case (A) mentioned above, or apply the pre-selected basis to the PRS resource according to case (B) mentioned above.

As shown in FIG. 3B, at step 8, the UE 110 applies the combination between each PRS, (i.e. PRS1, PRS2) and the selected or pre-selected basis to obtain the compressions r1, r2, etc.

The UE 110 may maintain a list of past results. As shown in FIG. 3B, the UE decides to report the new values of r1, r2 at step 9, only if they are significantly different compared to the past reported ones. Prior to generating report transmitted at step 9, the UE 110 may apply a test like below:

| | |
|---|---|
| 1. | If divergence(ri(t), ri(t−1)) > threshold then<br>a. Report ri(t) |
| 2. | Else report reuse-flag(i) = 1. |
| 3. | Store ri(t). |

in which divergence is a metric characterizing how dissimilar the current result ri(t) is from the past result ri(t−1); i = 1,2,.... For example, the divergence metric can be the mean squared error (MSE).

As shown in FIG. 3B, after receiving the report, which contains either the compressions r1 or r2 . . . or a reuse-flag per PRS, the LMF 140, at step 10, proceeds to regenerate or reconstruct the PRS signals as received by the UE 110, i.e., it applies an inverse operation (denoted "recombine" in step 10, FIG. 3B) to reconstruct the PRS as observed by the UE 110.

As shown in FIG. 3B, at step 11, the reconstructed signals are then used to compute a UE location and additionally or optionally, to update a UE-specific (set of) errors like: Carrier frequency offset (CFO), Sampling time offset (STO), Phase noise (PN), etc, or any combination of the above.

The ML framework for enhanced localization, as shown in FIG. 3A and FIG. 3B, through which the measurement collection and reporting is agnostic, is proposed with respect to the ML model that uses the measurements. Specifically, the ML framework moves away from the standard NR positioning paradigm which requires a positioning receiver to extract positioning measurements that are physically explainable (such as the physical meaning (a) to (e) as mentioned above). Instead, the ML framework as shown in FIG. 3A merely requires the positioning receiver to extract a set of signal features which may characterize the RX signal best, and the NW may then use the set of signal features to reconstruct said characterized RX signal. Having reconstructed the RX signal, the NW may use the reconstructed RX signal to compute the UE location and infer UE-specific intrinsic errors. By doing so, the UE-specific RF and/or baseband (BB) architecture (e.g. number of RF chains, sampling frequency) becomes transparent to the NW.

In one embodiment, the projection operation onto a basis M may consists of applying a linear transformation on each PRS signal k, to obtain a projected signal rk i.e.:

$$rk = \text{combine}(x(k), M),$$

where the function combine may be implemented as:

$$\text{combine}(x(k), M = x(k)M,$$

where x(k) is the vector of received signal samples corresponding to PRS k. For example, the PRS k is to designate a unique signal e.g. coming from one TRP, one of its beams, one time instance, etc.

In another embodiment, the projection operation onto a basis M may consists of applying a linear transformation on a (sub)set of PRS signals collected in a matrix X[p]=[x(1), . . . , x(p)] i.e.:

$$rp = \text{combine}(X[p], M) = X[p]M.$$

The subset p may be chosen by the UE based on common properties of the signals x(1), . . . , x(p); for example, the UE may decide to concatenate the following signals: (i) received with the same RX beam index. In this case, signals x(1), . . . , x(p) are all PRS received by the same RX beam index; or (ii) received in the same carrier frequency. In this case, signals x(1), . . . , x(p) are all the PRS received in the same band.

In this case, the UE 110 needs to report back to the LMF 140 the concatenation rule as well i.e. identify which PRS resources have been used to generate matrix X[p] which yields the reported signal rp.

In another embodiment, the network device 140 configures the UE 110 on the level of transformation applied on the measured PRS signals at the UE side. The LMF 140 may provide to the UE 110 the conditions which, if satisfied, the UE 110 should apply the projection operation or projector M1, M2, . . . , etc, where such conditions refer to the signal quality level.

For example, the UE 110 is configured by the LMF 140 to apply the projection operation or projector M1 if the conducted quality measurements (e.g. SNR level) of at least PRS ID #1 and PRS ID #2 exceed a boundary that is determined by a network-configured threshold (e.g., Q1), for at least a configured amount of time (e.g., T1 seconds).

For example, the LMF 140 may configure the UE 110 to apply the projection operation or projector M2 if the conducted quality measurements of the same PRS IDs exceed another boundary (e.g., determined by another network-configured threshold, Q2) for at least T1 seconds.

For example, the LMF 140 may configure the UE 110 to apply another projection operation or projector (e.g., M3) if the quality measurements exceed the same network-configured boundaries but for another time duration (e.g., for at least T3 seconds where T2>T1 and is also configured by the network device).

Figure 3C:
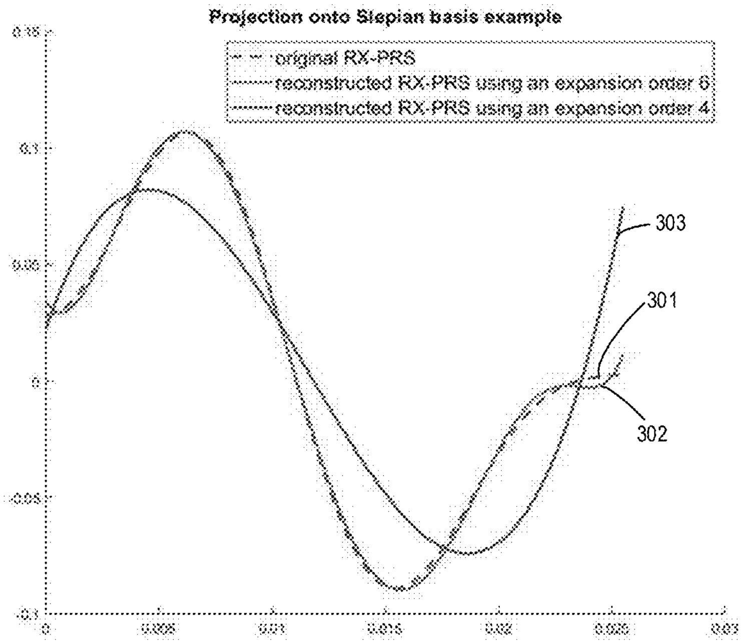
FIG. 3C illustrates an example for a comparison between a reconstructed signal and an original signal according to some embodiments of the present disclosure.

FIG. 3C illustrates an example for a comparison between a reconstructed signal and an original signal according to some embodiments of the present disclosure.

As shown in FIG. 3C, in the proposed ML-based LPP, the original RX-PRS (dashed line 301, 256 samples), may be well approximated with 6 coefficients corresponding to the line 302 (i.e. line 302, which indicates a reconstructed RX-PRS using an expansion order 6), when using a mapping to a Slepian basis. This means, that by transferring a vector of 6 values, the LMF 140 can fully reconstruct the original 256-samples channel that the target UE 110 is observing, and may use all 256 samples to locate the UE 110. The reconstructed RX-PRS using an expansion order 4 is denoted by line 303, and it does not fully reconstruct the original 256-samples channel that the target UE 110 is observing.

By contrast, in standard LPP, the LMF may ask the UE to report: (delay, gain) of the first N multipath components, where N may be e.g. 8 (see per agreement RANI #107-*e* on multipath reporting). Therefore, the UE would need to report 2N=16 values, and thus a report size 37% larger than the proposed ML-based LPP of the present disclosure, with no guarantee on the final reconstruction channel quality, since it is up to the UE how to select the N components (e.g. UE may end up selecting the wrong e.g. highly correlated components, noise artifacts).

Through the comparison, it may conclude that the proposed ML-based LPP of the present disclosure instructs the UE 110 on what (number of values) and how the UE 110 should extract (what basis to use and how to generate it); in other words, what is necessary and sufficient for the LMF 140 to reconstruct the target channel (and thus the location). The instructions and measurement reports come with the benefit that the UE decision, which is made with regard to path selection, estimation, etc., and which is a major source of error in localization, is removed from LPP protocol.

Figure 4:
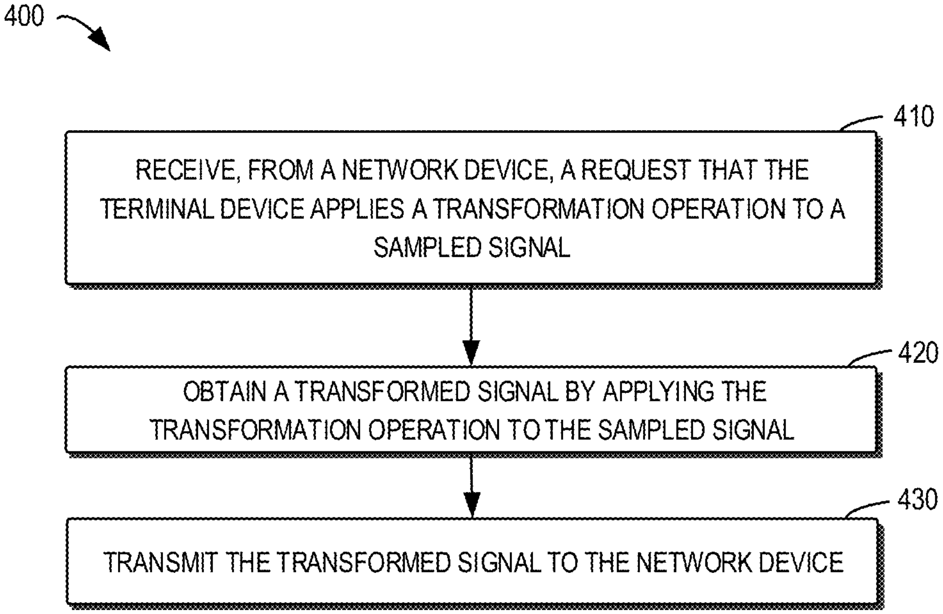
FIG. 4 illustrates an example flowchart of a method implemented at a terminal device according to example embodiments of the present disclosure.

FIG. 4 shows a flowchart of an example method 400 implemented at a terminal device (for example, the terminal device 110) in accordance with some embodiments of the present disclosure. For the purpose of discussion, the method 400 will be described from the perspective of the terminal device 110 with reference to FIG. 1.

At 410, the terminal device 110 receives, from a network device, a request that the terminal device applies a transformation operation to a sampled signal. At 420, the terminal device 110 obtains a transformed signal by applying the transformation operation to the sampled signal. At 430, the terminal device 110 transmits the transformed signal to the network device.

In some embodiments, the sampled signal is obtained by sampling a signal received from a transmitter, and the signal received from the transmitter comprises a reference signal (RS). In some embodiments, the transformation operation is performed by applying a projector or a basis to the sampled signal, the projector or the basis is transmitted from the network device, and the projector or the basis comprises at least one of the following: a matrix, a multivariate function, or an operation for extracting a set of metrics.

In some embodiments, under a condition that the sampled signal is associated with a target signal quality, the transformation operation is applied by the terminal device to the sampled signal to determine the transformed signal. In some embodiments, the target signal quality is associated with a minimal signal to noise ratio (SNR) level.

In some embodiments, the transformation operation is one of a set of transformation operations transmitted to the terminal device by the network device, and the transformation operation is selected by the terminal device from the set of transformation operations, based on at least one of: a terminal device capability, a terminal device radio frequency (RF) imperfections, a terminal device panel spatial setup, or quality level of the sampled signal, or the transformation operation is configured by the network device.

In some embodiments, information indicative of the transformation operation is transmitted along with the transformed signal to the network device. In some embodiments, the terminal device is further caused to: reject the transformation operation based on determining that the terminal device is incapable of performing the transformation operation.

In some embodiments, the terminal device is caused to: under a condition that a difference between the transformed signal and a previous transformed signal stored at the terminal device is greater than a transformed signal threshold, transmit the transformed signal to the network device; or under a condition that the difference is less than the transformed signal threshold, indicate via a flag, to the network device, the previous transformed signal is to be reused.

In some embodiments, the sampled signal is collected by the terminal device as a vector, and the transformation operation is applied to the vector. In some embodiments, the sampled signal is collected by the terminal device as a vector, and is one of a set of sampled signals obtained by sampling a plurality of signals received from a plurality of transmitters, and the transformation operation is applied to a set of vectors corresponding to a set of sampled signals received by a same receiving beam index or received in a same carrier frequency.

In some embodiments, the transformed signal is reconstructed by the network device to obtain a reconstructed signal for the signal received from the transmitter. In some embodiments, the reconstructed signal is used by the network device to determine a position of the terminal device and an intrinsic positioning error in the terminal device.

Figure 5:
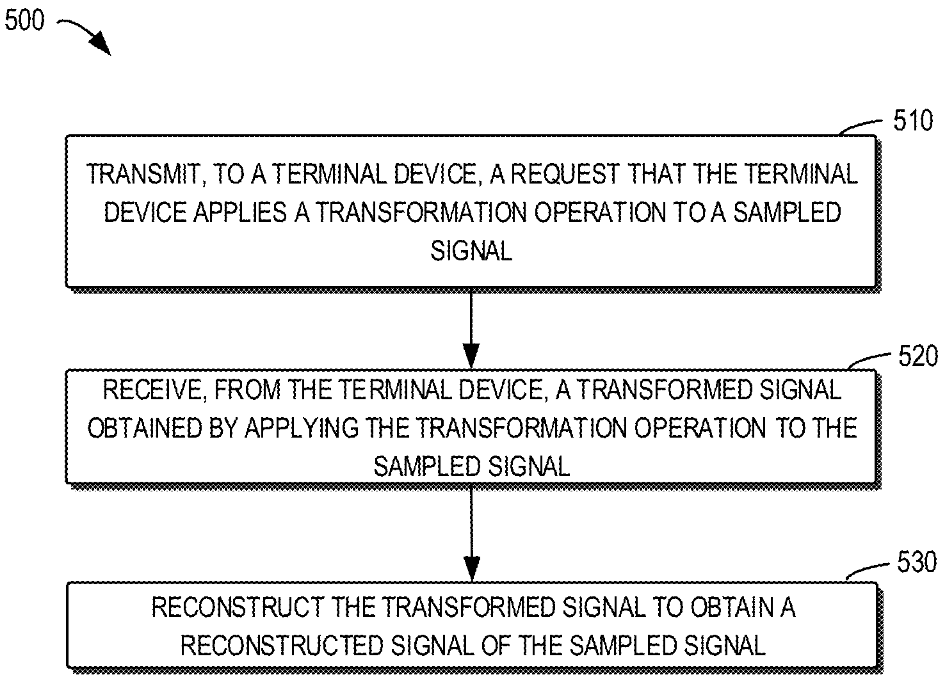
FIG. 5 illustrates an example flowchart of a method implemented at a network device according to example embodiments of the present disclosure.

FIG. 5 shows a flowchart of an example method 500 implemented at a network device (for example, the network device 140) in accordance with some embodiments of the present disclosure. For the purpose of discussion, the method 500 will be described from the perspective of the network device 140 with reference to FIG. 1.

At 510, the network device 140 transmits transmit, to a terminal device, a request that the terminal device applies a transformation operation to a sampled signal. At 520, the network device 140 receives, from the terminal device, a transformed signal obtained by applying the transformation operation to the sampled signal. At 530, the network device 140 reconstructs the transformed signal to obtain a reconstructed signal of the sampled signal.

In some embodiments, the sampled signal is obtained by sampling a signal received from a transmitter, and the signal received from the transmitter comprises a reference signal (RS). In some embodiments, the transformation operation is performed by applying a projector or a basis to the sampled signal, the projector or the basis is transmitted from the network device, and the projector or the basis comprises at least one of the following: a matrix, a multivariate function, or an operation for extracting a set of metrics.

In some embodiments, under a condition that the sampled signal is associated with a target signal quality, the transformation operation is applied by the terminal device to the sampled signal to obtain the transformed signal. In some embodiments, the target signal quality is associated with a minimal signal to noise ratio (SNR) level.

In some embodiments, the transformation operation is one of a set of transformation operations transmitted to the terminal device by the network device, and wherein the transformation operation is selected by the terminal device from the set of transformation operations, based on at least one of a terminal device capability, a terminal device radio frequency (RF) imperfections, a terminal device panel spatial setup or signal quality level of the sampled signal, or wherein the transformation operation is configured by the network device.

In some embodiments, information indicative of the transformation operation is transmitted along with the transformed signal to the network device. In some embodiments, based on determining that the terminal device is incapable of performing the transformation operation, the transformation operation is rejected by the terminal device.

In some embodiments, under a condition that a difference between the transformed signal and a previous transformed signal stored at the terminal device is greater than a transformed signal threshold, the transformed signal is transmitted to the network device; or under a condition that the difference is less than the transformed signal threshold, the network device is indicated that the previous transformed signal is to be reused via a flag.

In some embodiments, the sampled signal is collected by the terminal device as a vector, and the transformation operation is applied to the vector. In some embodiments, the sampled signal is collected by the terminal device as a vector, and is one of a set of sampled signals obtained by sampling a plurality of signals received from a plurality of transmitters, and the transformation operation is applied to a set of vectors, corresponding to a set of sampled signals received by a same receiving beam index or received in a same carrier frequency.

In some embodiments, the transformed signal is reconstructed by the network device to obtain a reconstructed signal for the signal received from the transmitter. In some embodiments, the reconstructed signal is used by the network device to determine a positon of the terminal device and an intrinsic positioning error in the terminal device.

In some embodiments, an apparatus capable of performing any of operations of the method 400 (for example, the terminal device 110) may include means for performing the respective steps of the method 400. The means may be implemented in any suitable form. For example, the means may be implemented in a circuitry or software module.

In some embodiments, the apparatus may include means for receiving, from a network device, a request that the terminal device applies a transformation operation to a sampled signal; means for obtaining a transformed signal by applying the transformation operation to the sampled signal; and means for transmitting the transformed signal to the network device.

In some embodiments, the sampled signal is obtained by sampling a signal received from a transmitter, and the signal received from the transmitter comprises a reference signal (RS).

In some embodiments, the transformation operation is performed by applying a projector or a basis to the sampled signal, and the projector or the basis is transmitted from the network device, and the projector or the basis comprises at least one of the following: a matrix, a multivariate function, or an operation for extracting a set of metrics.

In some embodiments, under a condition that the sampled signal is associated with a target signal quality, the transformation operation is applied by the terminal device to the sampled signal to determine the transformed signal.

In some embodiments, the target signal quality is associated with a minimal signal to noise ratio (SNR) level.

In some embodiments, the transformation operation is one of a set of transformation operations transmitted to the terminal device by the network device, and the transformation operation is selected by the terminal device from the set of transformation operations, based on at least one of a terminal device capability, a terminal device radio frequency (RF) imperfections, a terminal device panel spatial setup, or quality level of the sampled signal, or the transformation operation is configured by the network device.

In some embodiments, information indicative of the transformation operation is transmitted along with the transformed signal to the network device.

In some embodiments, the terminal device includes means for rejecting the transformation operation based on determining that the terminal device is incapable of performing the transformation operation.

In some embodiments, the terminal device includes means for: transmit the transformed signal to the network device under a condition that a difference between the transformed signal and a previous transformed signal stored at the terminal device is greater than a transformed signal threshold; or means for indicating via a flag, under a condition that the difference is less than the transformed signal threshold, to the network device, the previous transformed signal is to be reused.

In some embodiments, the sampled signal is collected by the terminal device as a vector, and the transformation operation is applied to the vector.

In some embodiments, the sampled signal is collected by the terminal device as a vector, and is one of a set of sampled signals obtained by sampling a plurality of signals received from a plurality of transmitters, and the transformation operation is applied to a set of vectors corresponding to a set of sampled signals received by a same receiving beam index or received in a same carrier frequency.

In some embodiments, the reconstructed signal is used by the network device to determine a position of the terminal device and an intrinsic positioning error in the terminal device.

In some embodiments, the apparatus further comprises means for performing other steps in some embodiments of the method 400. In some embodiments, the means comprises at least one processor and at least one memory including computer program code, the at least one memory and computer program code configured to, with the at least one processor, cause the performance of the apparatus.

In some embodiments, an apparatus capable of performing any of the method 500 (for example, the network device 120) may include means for performing the respective steps of the method 500. The means may be implemented in any suitable form. For example, the means may be implemented in a circuitry or software module.

In some embodiments, the apparatus may further include means for transmitting transmit, to a terminal device, a request that the terminal device applies a transformation operation to a sampled signal; means for receiving from the terminal device, a transformed signal obtained by applying the transformation operation to the sampled signal; and means for reconstructing the transformed signal to obtain a reconstructed signal of the sampled signal.

In some embodiments, the sampled signal is obtained by sampling a signal received from a transmitter, and the signal received from the transmitter comprises a reference signal (RS).

In some embodiments, the transformation operation is performed by applying a projector or a basis to the sampled signal, the projector or the basis is transmitted from the network device, and the projector or the basis comprises at least one of the following: a matrix, a multivariate function, or an operation for extracting a set of metrics.

In some embodiments, under a condition that the sampled signal is associated with a target signal quality, the transformation operation is applied by the terminal device to the sampled signal to obtain the transformed signal.

In some embodiments, the target signal quality is associated with a minimal signal to noise ratio (SNR) level.

In some embodiments, the transformation operation is one of a set of transformation operations transmitted to the terminal device by the network device, and wherein the transformation operation is selected by the terminal device from the set of transformation operations, based on at least one of a terminal device capability, a terminal device radio frequency (RF) imperfections, a terminal device panel spatial setup or signal quality level of the sampled signal, or wherein the transformation operation is configured by the network device.

In some embodiments, information indicative of the transformation operation is transmitted along with the transformed signal to the network device In some embodiments, based on determining that the terminal device is incapable of performing the transformation operation, the transformation operation is rejected by the terminal device.

In some embodiments, under a condition that a difference between the transformed signal and a previous transformed signal stored at the terminal device is greater than a transformed signal threshold, the transformed signal is transmitted to the network device; or under a condition that the difference is less than the transformed signal threshold, the network device is indicated that the previous transformed signal is to be reused via a flag.

In some embodiments, the sampled signal is collected by the terminal device as a vector, and the transformation operation is applied to the vector.

In some embodiments, the sampled signal is collected by the terminal device as a vector, and is one of a set of sampled signals obtained by sampling a plurality of signals received from a plurality of transmitters, and the transformation operation is applied to a set of vectors, corresponding to a set of sampled signals received by a same receiving beam index or received in a same carrier frequency.

In some embodiments, the reconstructed signal is used by the network device to determine a positon of the terminal device and an intrinsic positioning error in the terminal device.

In some embodiments, the apparatus further comprises means for performing other steps in some embodiments of the method 500. In some embodiments, the means comprises at least one processor and at least one memory including computer program code, the at least one memory and computer program code configured to, with the at least one processor, cause the performance of the apparatus.

Figure 6:
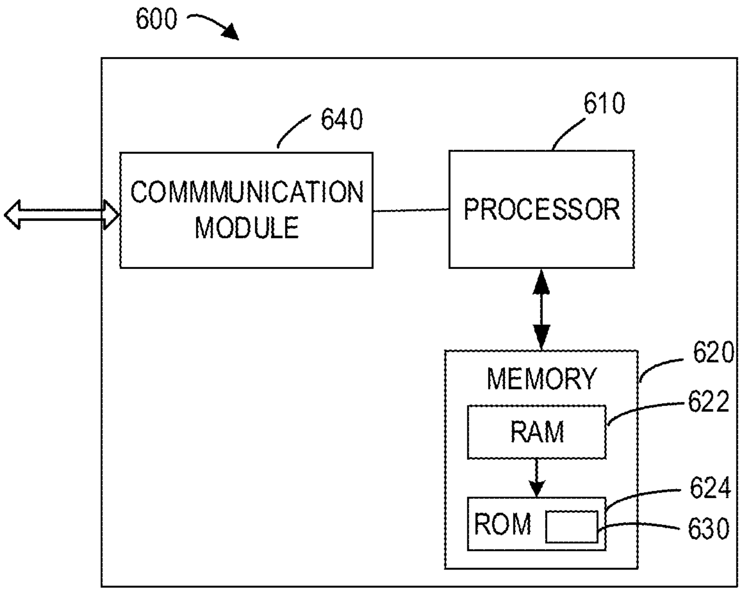
FIG. 6 illustrates an example simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a read only memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program so that the device 600 may perform any process of the disclosure as discussed with reference to FIGS. 2, 4 and 5. The embodiments of the present disclosure may also be implemented by hardware or by a combination of software and hardware.

Figure 7:
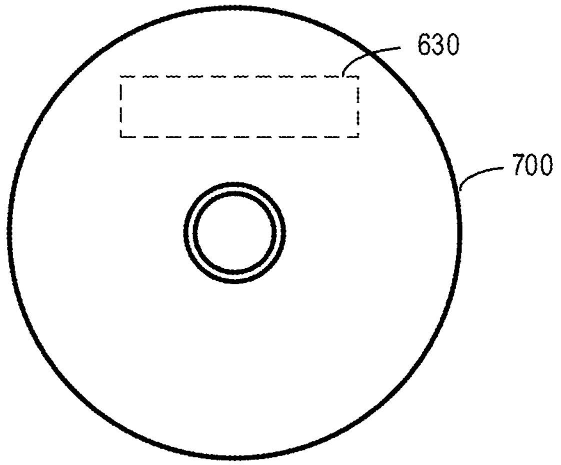
FIG. 7 illustrates an example block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out process 200, the method 400 or 500 as described above with reference to FIG. 2, FIG. 4, or FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:

at least one processor; and at least one memory storing instructions that, when executed by the processor, cause the terminal device at least to:

receive, from a network device, a request that the terminal device applies a transformation operation to a sampled signal;

obtain the sampled signal by sampling a signal received from a transmitter, wherein the signal received from the transmitter comprises a reference signal (RS);

determine a transformed signal by applying the transformation operation to the sampled signal, wherein the sampled signal is associated with a target signal quality; and transmit the transformed signal to the network device.

2. The terminal device of claim 1, wherein:

the transformation operation is performed by applying a projector or a basis to the sampled signal, the projector or the basis is transmitted from the network device, and the projector or the basis comprises at least one of: a matrix, a multivariate function, and an operation for extracting a set of metrics.

3. The terminal device of claim 1, wherein the target signal quality is associated with a minimal signal to noise ratio (SNR) level.

4. The terminal device of claim 1, wherein the transformation operation is one of a set of transformation operations transmitted to the terminal device by the network device, and wherein the transformation operation is selected by the terminal device from the set of transformation operations based on at least one of a terminal device capability, terminal device radio frequency (RF) imperfections, a terminal device panel spatial setup, or a signal quality level of the sampled signal, or wherein the transformation operation is configured by the network device.

5. The terminal device of claim 4, wherein information indicative of the transformation operation is transmitted along with the transformed signal to the network device.

6. A method performed by a terminal device, comprising:

receiving, from a network device, a request that the terminal device applies a transformation operation to a sampled signal;

obtaining the sampled signal by sampling a signal received from a transmitter, wherein the signal received from the transmitter comprises a reference signal (RS);

determining a transformed signal by applying the transformation operation to the sampled signal, wherein the sampled signal is associated with a target signal quality; and transmitting the transformed signal to the network device.

7. The method of claim 6, wherein:

the transformation operation is performed by applying a projector or a basis to the sampled signal, the projector or the basis is transmitted from the network device, and the projector or the basis comprises at least one of: a matrix, a multivariate function, and an operation for extracting a set of metrics.

8. The method of claim 6, wherein the target signal quality is associated with a minimal signal to noise ratio (SNR) level.

9. The method of claim 6, wherein the transformation operation is one of a set of transformation operations transmitted to the terminal device by the network device, and wherein the transformation operation is selected by the terminal device from the set of transformation operations based on at least one of a terminal device capability, terminal device radio frequency (RF) imperfections, a terminal device panel spatial setup, or a signal quality level of the sampled signal, or wherein the transformation operation is configured by the network device.

10. The method of claim 9, wherein information indicative of the transformation operation is transmitted along with the transformed signal to the network device.

11. A non-transitory computer readable medium comprising program instructions for causing an apparatus to perform:

receiving, from a network device, a request that the apparatus applies a transformation operation to a sampled signal;

obtaining the sampled signal is obtained by sampling a signal received from a transmitter, wherein the signal received from the transmitter comprises a reference signal (RS);

determining a transformed signal by applying the transformation operation to the sampled signal, wherein the sampled signal is associated with a target signal quality; and transmitting the transformed signal to the network device.

12. The non-transitory computer readable medium of claim 11, wherein:

the transformation operation is performed by applying a projector or a basis to the sampled signal, the projector or the basis is transmitted from the network device, and the projector or the basis comprises at least one of: a matrix, a multivariate function, and an operation for extracting a set of metrics.

13. The non-transitory computer readable medium of claim 11, wherein the target signal quality is associated with a minimal signal to noise ratio (SNR) level.

14. The non-transitory computer readable medium of claim 11, wherein the transformation operation is one of a set of transformation operations transmitted to the apparatus by the network device, and wherein the transformation operation is selected by the apparatus from the set of transformation operations, based on at least one of an apparatus capability, apparatus radio frequency (RF) imperfections, an apparatus panel spatial setup, or a signal quality level of the sampled signal, or wherein the transformation operation is configured by the network device.

* * * * *